(No Model.) 2 Sheets—Sheet 2.

J. W. LOREE.
POTATO DIGGER.

No. 401,285. Patented Apr. 9, 1889.

Witnesses

Inventor
John W. Loree.
By his Attorney
James J Sheehy

UNITED STATES PATENT OFFICE.

JOHN W. LOREE, OF FENWICK, ASSIGNOR OF ONE-HALF TO D. W. LOREE, OF RIDGEWAY, MICHIGAN.

POTATO-DIGGER.

SPECIFICATION forming part of Letters Patent No. 401,285, dated April 9, 1889.

Application filed July 9, 1888. Serial No. 279,418. (No model.)

*To all whom it may concern:*

Be it known that I, JOHN W. LOREE, a citizen of the United States, residing at Fenwick, in the county of Montcalm and State of Michigan, have invented certain new and useful Improvements in Potato-Diggers; and I do declare the following to be a full, clear, and exact description of the invention, such as will enable others skilled in the art to which it appertains to make and use the same.

This invention has relation to machines for digging potatoes, and it may be adapted for digging peanuts and the like.

The improvements will be fully understood from the following description and claims, when taken in connection with the accompanying drawings, in which—

Figure 1:
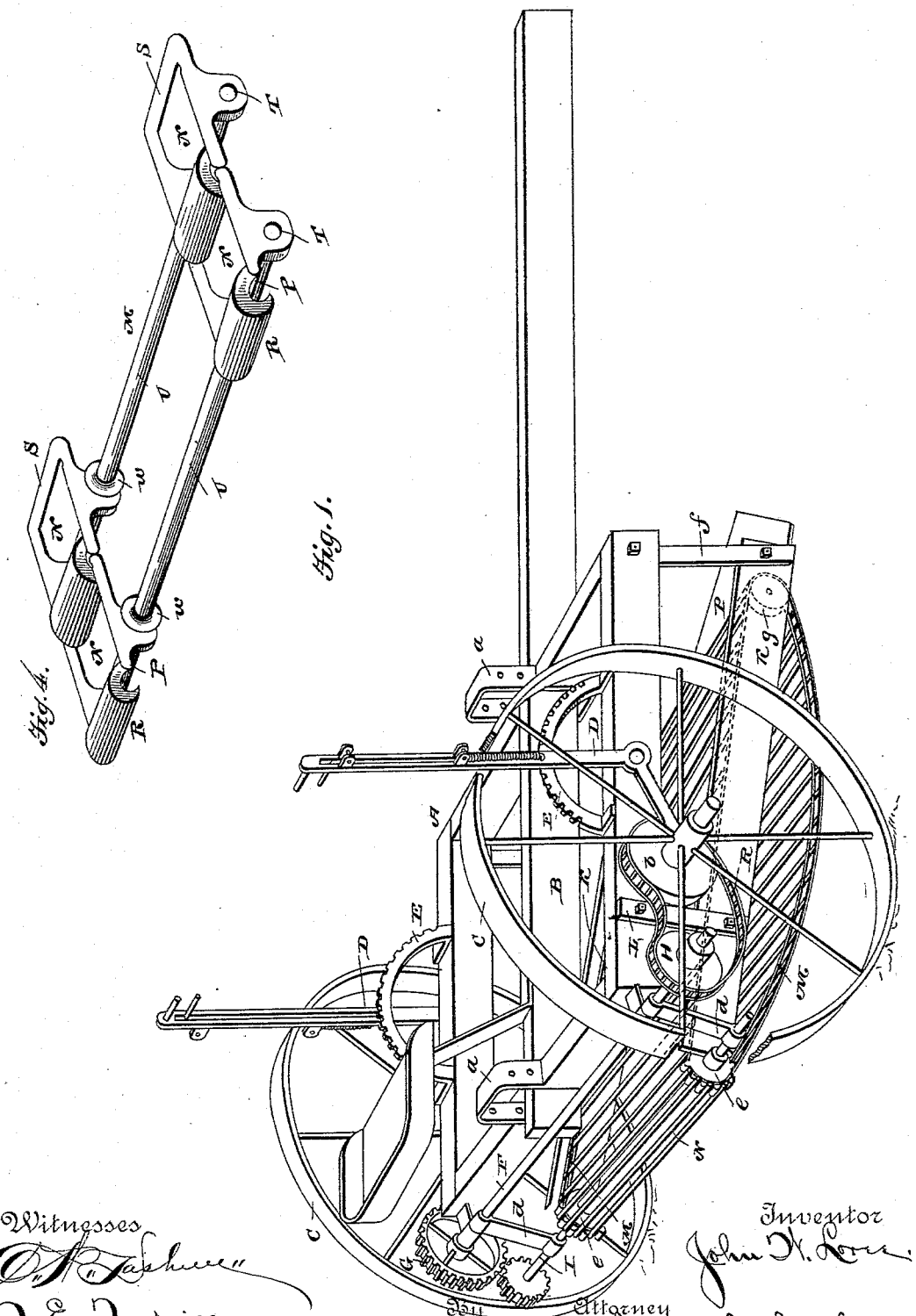
Figure 2:
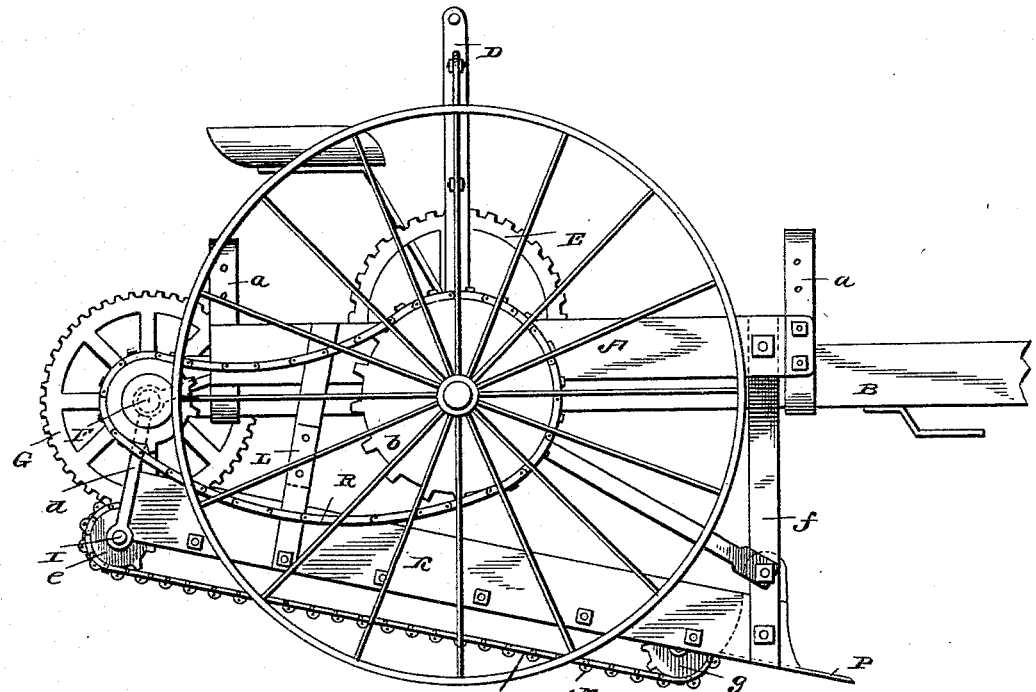
Figure 3:
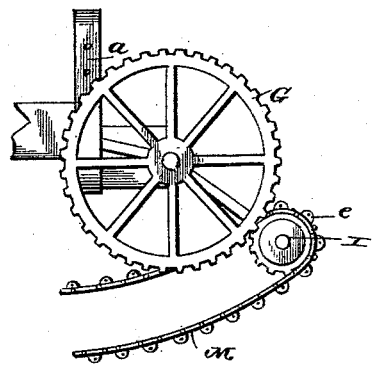

Figure 1 is a perspective view of a machine embodying my invention. Fig. 2 is a side view of the same. Fig 3 is a sectional detail view, and Fig. 4 is a detail perspective view of a portion of the endless chain or carrier.

Referring by letter to the said drawings, A indicates the main frame, which is of a rectangular form and composed of side and transverse beams, the latter of which are provided about midway of their length with vertically-disposed loops a, to receive the draft-beam B. These loops are extended sufficiently above and below the said frame A to permit of the draft-beam being moved therein to accommodate the same in the adjustment of the machine to the draft-animals.

C indicate the supporting and driving wheels, which are provided with a pinion or drum, b, and their spindles are formed on one branch of an angular lever, D. This lever D, as more fully shown in Fig. 1 of the drawings, is pivoted at its angle to the outer side of the side beams of the main frame, and has its vertical branch carried up within convenient reach of the driver. It should be observed that the pinion or pulley b is fixed to the axle or center or hub of the main driving-wheel, there being one on each side of the machine.

E indicate segmental racks, there being one fixed in a vertical position to the upper edge of each side rail of the main frame, and are designed to receive a spring-actuated dog on the hand-lever or vertical branch of the angular lever D. It will thus be seen that by releasing the dog from engagement with the segmental rack the levers may be moved to or from the driver, and the main frame caused to raise or lower by the elevating and depressing of the supporting-wheels, which are journaled on spindles extending laterally from the lower branch of the angular levers.

Journaled in the rear of the main frame A is a transverse shaft, F, which is provided at one end with a gear-wheel, G, and at is opposite end with a chain wheel or pulley, H, for a purpose which will be presently explained.

Depending from the shaft F are hangers d, the lower ends of which terminate in eyes to receive a lower transverse shaft, I, carrying pinions on its opposite ends, and it has also fixed to it an intermediate pinion, e.

The forward end of the main frame is provided at each corner with a depending arm, f, and secured to the lower ends of the arms is the forward end of longitudinal side guards, K, the rear ends of which may be sustained by the rear transverse shaft, I, or an intermediate arm, L, the latter being preferred. The rear transverse shaft, I, has a chain wheel or pinion, e, similar to the one previously mentioned, and both are designed to receive an endless chain, which will be presently explained.

M indicates the endless carrier, which is of a peculiar construction, being composed of links N, which have cross-bars at opposite ends. The cross-bars have hooks R formed thereon, so as to engage the cross-bar S of the adjacent link. These links are also provided with eyes T, which are designed to receive the opposite ends of transverse bars U, which are usually arranged about one and one-quarter inch apart, although the distance may be varied. The portions bearing the eye or perforation are so arranged as to receive the chain-wheels between them in operation, and it is obvious that each link may have two or more eyes, according to the distance at which it is desired to place the transverse rods. These rods V have shoulders W at a sufficient distance from their ends, so as to engage the inner sides of the links, as shown. I attach importance to the employment of this endless elevator and to its peculiar mode of construction. It will be seen from the illustration that it may be readily lengthened or shortened, and should any of the cross-rods become impaired they may be readily removed and replaced by others.

In the forward ends of the side guards, K, is journaled a shaft, which is also provided at opposite ends with pulleys or chain-wheels g, which also receive the endless elevator and sustain its forward portion.

P indicates the plow or blade, which is at the lower ends of the side guards, K, and may be of the usual construction, it being designed to raise the potatoes from their beds and direct them to the endless carrier, which assumes an inclined position. It will be observed that as the machine is carried along the field in operation the frictional contact of the supporting-wheels with the earth will rotate them, and the small gears or pulleys being fixed to the supporting-wheels will of course receive a similar motion, which motion, by means of an endless chain or belt, R, passing over the wheel H, will impart a rotary motion to the shaft F and the gear-wheel G thereon, which latter will communicate its motion, through the medium of the pinion on the shaft I, to the chain wheels or pinions e and drive the endless elevator.

When it is desirable to lower the plow, the same can be conveniently accomplished by the driver manipulating the hand so as to depress or elevate the supporting-wheels.

Having described my invention, what I claim is—

1. In a machine for digging potatoes and the like, the combination, with the main frame, of the central vertical loops, the draft-beam placed therein, the plow-frame depending from the main frame on hangers, the endless elevator, the supporting-wheels journaled on angular levers, the gearing and drive belts, the segmental racks, and the spring-dog in the said hand-levers, substantially as specified.

2. The combination, with the main frame having the vertical loops, as described, of the angular levers D, pivoted to the said frame and carrying spindles at their lower branches, the supporting-wheels having fixed pulleys or gears and arranged on the spindles of the angular levers, the segmental racks on the main frame, an endless elevator, and the shaft I, receiving the endless elevator, the shaft F, and the intermeshing gears on the respective shafts, substantially as specified.

3. The endless elevator composed of the links having cross-bars at one end and hooks at the opposite ends and eyes between the hooks and cross-bars, and the transverse rods having shoulders near their opposite ends and adapted to enter the eyes in the links, the whole designed to serve in a machine for digging potatoes or peanuts, substantially as specified.

In testimony whereof I affix my signature in presence of two witnesses.

JOHN W. LOREE.

Witnesses:
   GEO. W. EITELBUSS,
   O. O. OSBORN.